Sept. 17, 1968 J. K. BRAGG 3,402,399
WORD-ORGANIZED ASSOCIATIVE CRYOTRON MEMORY
Filed Dec. 16, 1964
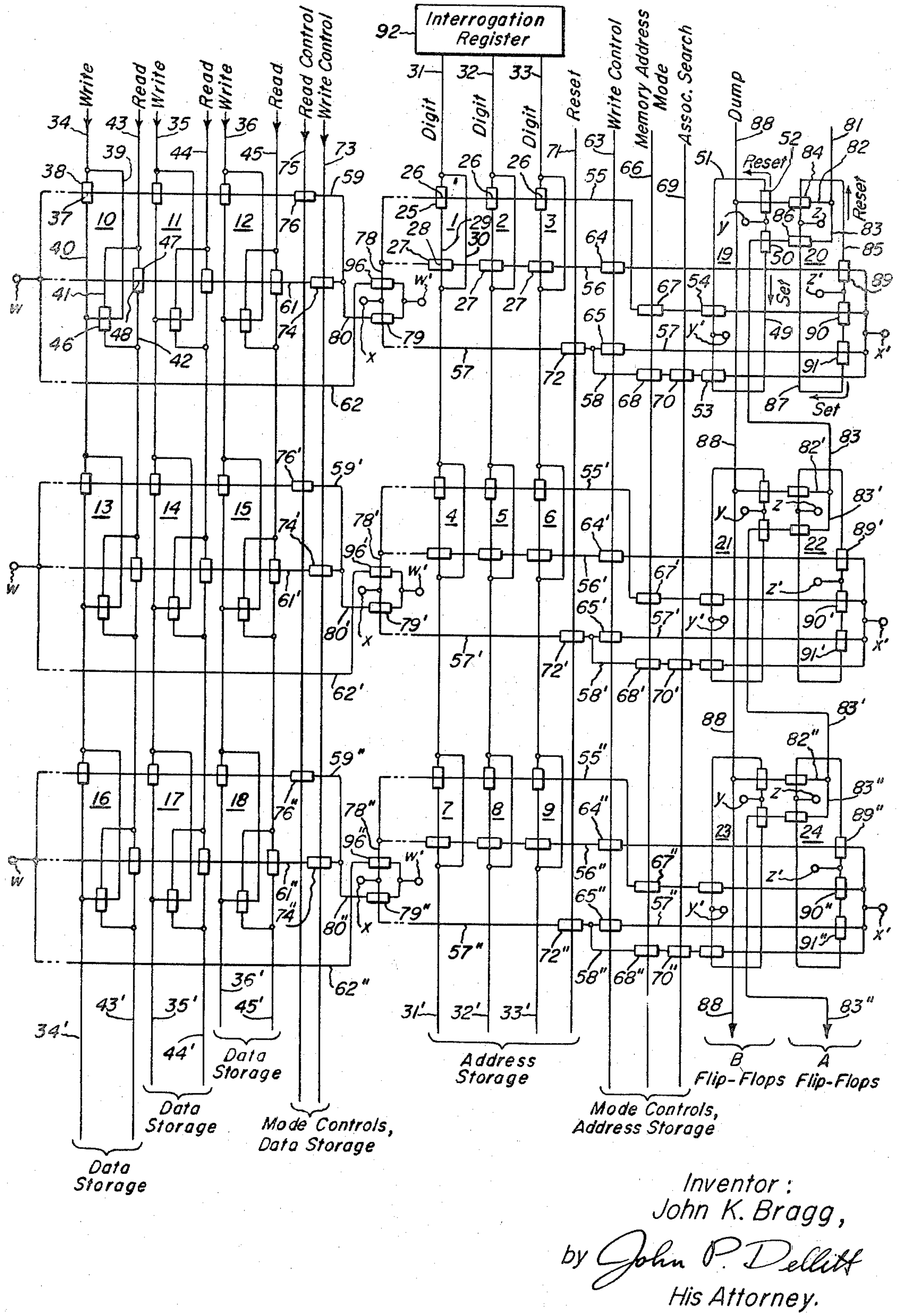
Inventor:
John K. Bragg,
by John P. DeWitt
His Attorney.

United States Patent Office 3,402,399

Patented Sept. 17, 1968

3,402,399

WORD-ORGANIZED ASSOCIATIVE CRYOTRON MEMORY

John K. Bragg, Schenectady, N.Y., assignor to General Electric Company, a corporation of New York Filed Dec. 16, 1964, Ser. No. 418,663
5 Claims. (Cl. 340—173.1)

ABSTRACT OF THE DISCLOSURE

A memory comprised of first and second word-organized cryotron arrays wherein the second array stores data words which correspond to address words stored in the first array and which are selected by the associative selection of only an address word of the first array. The memory facilitates circumvention of defective cryotrons electronically in either array.

This invention relates to a word organized, random access computer memory and particularly to such a memory employing cryogenic or superconducting storage elements.

Cryogenic or superconducting elements are of considerable interest in computing circuitry because their operation is largely lossless and therefore these elements are subject to considerable miniaturization and high packing density. These elements are of particular value in large computer memories wherein a large number of memory cells may be deposited in the form of thin films upon a plurality of substrates that are then interconnected. However, even though extreme miniaturization is possible in systems of this type, the miniaturization may lead to reproducibility rates in manufacture of less than 100%. In a highly packed location addressed memory, inoperable memory locations are frequently found, the repair of which would be uneconomical.

A different memory system concept avoids some of the problems inherent in location addressed memories. This type of memory is termed "data addressed" or "associative" referring to the retrieval of information on the basis of content rather than its numerical address or location in the memory. In operation of memories of this type, all memory locations are interrogated at the same time using a particular information tag as the interrogator, and one or more memory locations containing information including the tag responds to the interrogation. Such a memory is less susceptible to problems of reproducibility in manufacture because of inherent redundancy, all of the circuitry for each memory word location being substantially the same. If a memory location is found to contain a faulty element, the memory word including such location is simply not used and the loss thereof is usually insignificant in a memory containing a large number of locations. However, the data addressed or associative memory is not without disadvantages. Each memory cell is relatively complicated because it must provide the attributes of comparison and gating as well as "read" and "write" functions. Moreover, the operation of the usual associative memory in a comparison mode is slowed due to inductive operating leads extending to each memory word location and between stacked substrates. These inductive leads are employed during the comparison mode for determining the first memory location responsive to a given interrogation.

It is therefore an object of the present invention to provide an improved cryogenic memory system having the advantages of high reproducibility due to redundancy without attendant circuit complexity.

It is another object of the present invention to provide an improved cryogenic memory system having high reproducibility due to redundancy while attaining operating speed characteristic of location addressed memory systems.

In accordance with the present invention, a cryogenic memory system is composed of a first word-organized array of superconducting cells for operation in a partial data addressed mode and capable of containing a series of numerical or distinctive addresses and a second word-organized memory array containing retrievable data addressed by the first memory array. The second array includes a plurality of data words corresponding to the address words in the first array and selected by the associative selection of an address word of such first array. The individual memory cells of the first array are simplified because the memory location need never be read out. Also, the memory cells of the second array are simplified because they need not be responsive to an overall comparison. Inductive connections between memory locations and between substrates need be operated only during entrance of unique addresses into the aforementioned first array. After entrance of unique addresses as the words stored in said first array, the inductive interconnections are no longer used. Also, during the initial testing of the memory system according to the present invention, non-responsive memory words are passed over or one or more digits are entered therein functioning to prevent selection thereof during subsequent operation of the memory.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawing wherein like reference characters refer to like elements and wherein the drawing is a schematic diagram of the memory system in accordance with the present invention.

Referring to the drawing, a first memory array in accordance with the present invention includes memory cells 1–9 and a second memory array includes memory cells 10–18. Each array is word-organized, that is, information is stored, selected and, in the case of the second array, read out on a word basis. Memory cells 1, 2 and 3 represent an address word or number in the first array of the memory system and cells 10, 11 and 12 represent a corresponding word of data in the second array of the present memory system. It is of course understood an actual memory system would include a much larger number of digits per word and a much larger number of words than illustrated on the drawing, the number shown in the drawing being for illustrative purposes only. The organization of the second array of the present invention may be described as comprising rows and columns wherein the rows include memory cells storing a given word and the columns correspond to the digits thereof. It is understood the row and column terminology is intended to be indicative of electrical connection rather than necessary physical location in rows and columns. The entire memory system is refrigerated to such a temperature and the components thereof are formed of such materials that all conductors are normally superconductive or resistanceless.

Elementary units of the memory system will be described prior to describing the operation of the complete system. The memory cell 1 of the first or data addressed memory array will be taken as exemplary of similar units 1 through 9. Memory cell 1 includes a first cryotron having a gate 25 and a control grid 26, and a second cryotron including a gate 27 and a control grid 28. In each such cryotron, current of a given magnitude in the control grid renders the underlying gate resistive due to the magnetic field surrounding current in the control grid.

In each case current will prefer to flow in a path including a cryotron gate that remains superconducting rather than one which is resistive.

Memory cell 1 principally comprises a persistent current loop circuit having a first side conductor 29, serially including gate 25 as well as grid 28, and a second side conductor 30. The first and second side conductors join a digit current line 31–31' at either end of the loop. The digit current line receives current from interrogation register 92 as it becomes desirable to enter information into cell 1 and, at a later time, to interrogate information in cell 1. Information in the form of a circulating peristent current is entered into cell 1 by providing a current pulse in digit line 31–31' from interrogation register 92. It is understood digit line 31–31', after proceeding down one column of the memory array, will be returned to interrogation register 92. The current from digit line 31 will tend to divide between side conductors 29 and 30; however, a current is then passed through control grid 26 so the current from digit line 31 is diverted to side conductor 30. Now, current is discontinued in control grid 26 but current from digit line 31 will remain diverted through side conductor 30 since no voltage exists across side conductor 29 for causing current flow therein. If current from digit line 31 is now discontinued, a circulating current will flow in the loop including side conductors 29 and 30. If the initial current pulse in line 31–31' is downward such circulating or persistent current will flow downward in side conductor 30 and upward in side conductor 29 until such time as this current is quenched by passage of an erase current in control grid 26. A digit of information is thus stored in memory cell for an indefinite period. In the present memory system embodiment, a clockwise circulating current, caused by a downward current in line 31–31', will be taken to represent the digit "one" and a counterclockwise circulating current will be taken to represent the digit "zero." The counterclockwise circulating current representing a zero can be entered into a cell in accordance with the above procedure with a reversal of the direction of initial current pulse in digit line 31. It is understood information is entered in a similar manner into cells 2 and 3 from the interrogation register via digit lines 32 and 33. An address is subsequently entered in rows comprising cells 4–6, and so on.

Cells 1 through 9 may also be operated in an interrogation mode whereby information subsequently contained in interrogation register 92 is compared with a particular row in the first array, for example, cells 1–3. Cell 1 will again be taken as an example. Assume cell 1 stores a digit "one" as a clockwise circulating current down in side 30 and up in side 29. Now assume another digit "one" is applied (in a downward direction) for comparison purposes on digit line 31–31' from interrogation register 92. The latter current will be superimposed upon the current circulating in cell 1 without destroying the circulating current. Thus the downward current from digit line 31 divides between side conductors 29 and 30 in a downward direction in each of those conductors. This divided current adds to the downward circulating current on side 30 but subtracts from the upward circulating current in side 29. Therefore the net current in control grid 28 in this instance is either substantially zero or materially reduced so that gate 27 is not rendered resistive. On the other hand if an upward current were caused to flow in digit line 31, representing a binary zero, the circulating current and the digit line current will add on side 29 rendering cryotron gate 27 resistive. The resistance or superconductance of cryotron gate 27 represents the comparison output for cell 1. In the present example, absence of resistance indicates a favorable comparison. It should be noted that the mere presence of a circulating current in cell 1 without the addition of another digit line current for comparison is arranged not to render cryotron gate 27 resistive. Thus, for example, cryotron grid 28 for this "comparison" cryotron is slightly wider than grids for other cryotrons and this widening is taken to a width beyond that which will cause cryotron gate 27 to become resistive with only the circulating current flowing in the cell, but to a width adequate for causing gate 27 to become resistive when a digit line current and a circulating current are additive.

Memory cells of a second memory array, numbered 10–18 on the drawing, operate to store information in a similar manner. Thus, a downward current in the write line 34–34' concurrent with a current in cryotron control grid 37 overlying cryotron gate 38, will cause current diversion to side conductor 39, even after discontinuance of current in control grid 37. Then when current is discontinued in write line 34, a circulating current will be established in the loop including side conductors 39 and 40. It is, of course, understood the current in write line 34 after proceeding down a column of the memory array, will be returned to a source of write current (not shown) for that column of the array, which source is selectable dependent upon the information to be stored in the memory cells and the same can be said of the other column current conductors illustrated in the drawing, for example write lines 35 and 36.

An additional circuit configuration included in each memory cell of the second array comprises a second loop comprising side conductors 41 and 42 (in cell 10, for example) fed in common from read line 43–43'. Side conductor 41 includes a cryotron gate 46 the resistance of which is controlled by current in side conductor 39 disposed in cryotron grid relation thereto. Side conductor 42 also includes a cryotron gate 47. A read current impressed upon a read line 43 will flow in either side conductor 41 or 42 according to whether cryotron gate 46 or 47 is rendered resistive. If gate 46 is rendered resistive by current in side conductor 39, the read current must pass through side conductor 42. However, if cryotron gate 47 is also rendered resistive due to a current in its associated grid conductor 48, then resistance is introduced into read line 43 indicating a persistent current stored in cell 10 representative of a specific binary number. In this second memory array it is convenient to consider a circulating current in side conductors 39 and 40 as indicative of a stored "one"and the absence of such current is indicative of a "zero." Read conductors 44 and 45 also extend in a similar manner down columns of the second array for the purpose of reading information.

The memory system also includes A flip-flops 20, 22 and 24 as well as B flip-flops 19, 21 and 23. The operation of B flip-flop 19 will be taken as an example. A current is continuously applied between terminals *y* and *y'*. This current, in the absence of a contrary influence, will tend to divide between the "set" and "reset" directions. However, set conductor 49 includes a cryotron gate 50 and reset conductor 51 includes a cryotron gate 52. Either gate 50 or 52 is separately rendered resistive in accordance with operation of the present memory system but both gates are not rendered resistive at the same time. If gate 50 is rendered resistive, current applied between terminals *y–y'* will flow in reset conductor 51. This current will continue in reset conductor 51 even if cryotron gate 50 be returned to the superconducting state. Similarly, if cryotron gate 52 is rendered resistive, current between terminals *y* and *y'* will be forced to flow in set conductor 49 and will remain diverted in set conductor 49. The state of flip-flop 19 is ascertained by means of cryotron gates 53 and 54 disposed such that set and reset conductors 49 and 51 include cryotron grid means cooperatively associated with the cryotron gates 53 and 54.

Horizontal current conductors of the memory array, numbered 55, 56, 57 and 58, may also be considered as forming a flip-flop between current terminals *x* and *x'*. Conductor 55 is termed a write enable line, conductor 56 is termed an associative search line, conductor 57 is a bypass line, and conductor 58 is called an alternative bypass line.

Similarly conductors 59, 60 and 61 of the second array form a flip-flop between terminals *w* and *w'* between which current is continuously applied. Conductor 59 is termed a write enable line for the second array, conductor 61 is a read enable line and conductor 62 is a bypass line. Current may be directed through any one of these horizontal lines in accordance with the one of the said lines which is superconducting and this current will remain stable in such line until diverted to another horizontal line.

In addition to the foregoing circuit combinations, certain mode control lines are employed to control the operation of the memory system. In the first array, a write control line 63 is disposed in cryotron grid relation to cryotron gate 64 connected in series with line 56 in each row of the array, and in the same relation to cryotron gate 65 serially included in line 57 in each row of the array. Memory address mode line 66 is disposed in cryotron grid relation to cryotron gates 67 in series with line 55 and cryotron gate 68 in series with line 58. Associative search control line 69 is disposed in control grid relation to cryotron gate 70 in alternate bypass line 58. Reset line 71 has a cryotron grid relation to gate 72 in line 57.

In the second array write control 73 operates as a control grid with respect to gate 74 in line 61. Also read control line 75 has a similar function with respect to gate 76 in line 59.

The first and second arrays of the memory are intercoupled via cryotron gate 96 serially included in line 62 and controlled in grid relation from conductor 78 leading in common to lines 55 and 56. Also, a cryotron gate 79 is serially included in line 80 leading to lines 59 and 61. The control grid cooperating with gate 79 is in series with line 57. As thus appears, the state of horizontal currents as between lines 55, 56, and 57 in the first array in part determines the distribution of currents as between lines 59, 61 and 62 in the second array.

A vertical coupling ladder coordinates the function of the A and B flip-flops during the initial addressing and testing of the memory system in accordance with the present invention. A test line 81 has branches 82 and 83. Line 82 includes cryotron gate 84, having the A flip-flop's reset side conductor 85 disposed in grid relation thereto, in A flip-flop 20. Similarly, line 83 includes a gate 86 underlying set side conductor 87, wherein side conductor 87 operates as a control grid with respect to gate 86. Conductor 82 passes in grid relation to gate 52 of B flip-flop 19 while conductor 83 passes in similar grid relation to gate 50 of flip-flop 19. After passing over gate 52, conductor 82 connects to dump line 88. After passing over gate 50, line 83 branches into lines 82' and 83' having the same configuration with respect to A flip-flop 22 as did lines 82 and 83 with respect to flip-flop 20. This configuration is similarly repeated vertically through the array, and acts either to continue current along lines numbered 83–83'–83'', or to dump current into line 88 at a point depending upon which A flip-flop is "set." The status of the A flip-flop is in turn determined by current in line 56 in grid relation to cryotron gate 89 which is included in reset side conductor 85 of A flip-flop 20, for example, or by current in line 55 in grid relation to cryotron gate 90 included in side conductor 87, or by current in line 57 in grid relation to cryotron gate 91 in side conductor 87.

In operation, the first or "address" memory array including cells 1–9 stores unique addresses which act to locate information contained in the second array comprising memory cells 10–18. Each row of the first array acts to store a unique set of digits identifying the data stored in the correspondingly coupled row of the second array. The first array's set of unique addresses are electronically inserted and may take into account non-functioning memory rows by discarding them "electronically." This discarding can be accomplished at any time, e.g. during initial testing to take into account manufacturing faults or subsequently to correct for subsequent malfunctions. In this system, both the memory cells in the first or address array, and the second or storage array are simplified because of their differing function.

As a first procedure in memory operation, it is desired to insert unique addresses into the first or address array of the memory system comprising cells 1–9 starting with the first or top row comprising cells 1, 2 and 3. The array is readied for operation by energizing reset current line 71. Since gate 72 becomes resistive, a current applied between terminals *x* and *x'* is forced out of bypass line 57.

The B flip-flops are also initially arranged to be in reset condition and this takes place during repetitive operation as will hereinafter become more evident. At the very first this may also be accomplished, for example, by passing a current through lines 63 and 69 for resetting the A flip-flop, followed by a pulse on test line 81. Current then flows in side conductor 51 in B flip-flop 19, for example. Therefore cryotron gates 53 and 54 are resistive and the current between terminals *x* and *x'* will pass through associative search line 56. When the current in reset line 71 is turned off the current between *x* and *x'* will remain in associative search line 56, even though bypass line 57 is now non-resistive. All A flip-flops will be set, because current in line 56 will render cryotron gate 89 resistive in each row, and force the current between *z* and *z'* into side conductor 87.

Now a current is applied to associative search line 69 causing cryotron gate 70 to be resistive and current is prevented from flowing in alternative bypass line 58. Current between terminals *x* and *x'* will continue to flow through line 56 as current in line 69 is terminated, and therefore A flip-flop 20 will continue in a set condition. Current now applied to test line 81 will be forced to flow in line 82 because of the resistance of gate 86, rendering resistive gate 52, and setting B flip-flop 19. Current in B flip-flop 19 thus flows in side conductor 49. This current causes gate 53 to be resistive in alternative bypass line 58. The first or top row or word in the memory is identified for operation because the first row will be the only row having a set B flip-flop. In the remaining rows the reset B flip-flops will prevent current flow in gate 54 and no information can be written in the cells of the remaining rows. Current from test line 81 will remain in dump line 88 below the first row.

No actual address designation has as yet been entered into the first memory array. This may now be accomplished for the first row in the first array of the system comprising cells 1, 2 and 3. Downward current from interrogation register 92 on lines 31, 32 or 33 will be effective for entering a binary one (clockwise persistent current) in the corresponding cell 1, 2 or 3, while an upward current will be effective to enter a binary zero (counterclockwise persistent current). Current is applied on write control line 63 having the effect of forcing current applied between terminals *x* and *x'* into write enable line 55 including a control grid 26 overlying gates in the left side conductor of each of the loop circuits of cells 1, 2 and 3, e.g. side conductor 29 of cell 1. The current may be now removed from between terminals *x–x'* and after that the currents from digit lines 31, 32 and 33 are also shut off. Clockwise and counterclockwise circulating currents are now stored in cells 1, 2 and 3 in accordance with the sense of the currents which were caused to flow in lines 31, 32 and 33 from the interrogation register. The current in line 55 will also have had the effect of resetting A flip-flop 20 via gate 90.

Now a unique address designation can be entered in the second row of the first array of the memory system comprising cells 4, 5 and 6. The above procedure is repeated, further causing "zero" (upward) digit line currents to flow on digit lines 31–31′, 32–32′, and 33–33′ (after a reset current pulse on line 71). This time it will be noted that current will not remain in associative search line 56 of the top row because circulating current in cells 1, 2 or 3 plus a downward current in lines 31, 32 and 33 will render resistive one or more cryotron gates 27 in the first row of the first array. Therefore the current in the first row of the first array between terminals $x$ and $x'$ will be forced into line 57. Since current flows in conductor 85 of flip-flop 20, a test current applied to line 81 will flow in line 83 rather than line 82, resetting B flip-flop 19, and thence current flows to flip-flop 22 in the second row of the first array. Current flowing in line 83 over cryotron gate 50 in grid relation thereto retains B flip-flop 19 in the reset condition.

In the second row, however, A flip-flop 22 remains "set" and current in line 83 flows in line 82′ to dump line 88. B flip-flop 21 is then set permitting the initial writing of information in cells 4, 5 and 6 by means of digit line current applied on lines 31, 32 and 33 as well as write current in line 55′ in a manner hereinbefore set out. Similarly information is then entered in the row comprising cells 7, 8 and 9.

The information stored in each of the rows of the first array of the memory array comprises a unique series of address digits, for example successive numerical addresses used to identify the corresponding rows of the second memory array. However, when during the course of initially entering the addresses into the first array, a row is discovered which does not respond correctly to the procedures for entering address digits in the first array and the proceure for entrance and read out of information in the second array, such row may be passed over and ignored, its unique address being entered in the next successive row of the first array, etc. One or more binary digits are then entered into selected digit positions thereof which are arranged not to correspond to any interrogation subsequently applied to the first array from interrogation register 92. Then, such row will cause no difficulty in memory operation. Because of the large packing density in the memory system, it is more feasible to correct errors in this manner, that is "electronically," than to attempt either to obtain a perfect thin film deposition technique, or to attempt physical repair of memory rows having a malfunction. The same technique may be employed at a later time if a row malfunctions. Then the memory may be readdressed and the data reentered leaving out the malfunctioning row.

Information data will ordinarily be entered into the second array comprising cells 10–18 after the entrance of data row addresses into the first array. Ordinarily many changes will be made in the data stored in the second array for a single change in the address digits. It is contemplated the address portion will be retained after the unique series of addresses is initially entered therein and faulty rows are passed over.

In order to enter data into the second array or read information therefrom, an interrogation is entered into register 92 corresponding to the data's desired address. during this operation as in subsequent operations employing unique addresses, it is not necessary to operate test line 81 and the ladder comprising lines 82, 83, et seq. Therefore the ladder inductance is not encountered during normal operation of the memory system but only in the initial entrance of the addresses.

To ready the memory for operation in its memory address mode, a current is first applied on reset line 71. Also, current is applied on memory address mode line 66. The current caused to flow in memory address mode line 66 renders cryotron gate 67 resistive to keep current out of line 55. Line 66 also causes cryotron gate 68 to be resistive. If stored data in the top row agrees with the interrogation, current will flow in line 56. If not, current will be diverted to bypass 57 and alternative bypass 58. Assuming the former case, the line 56 current passing through conductor 78 over gate 96 renders the latter switching means resistive and therefore current flowing between terminals $w$ and $w'$ must flow in either line 59 or 61. (If agreement had not taken place switching means comprising cryotron gate 79 would have become resistive and current $w$–$w'$ would have taken the path of bypass line 62.) In case of agreement between interrogation and the address, the current between terminals $w$ and $w'$ flows either in write enable line 59 or read enable line 61, depending upon the function desired and the corresponding current applied to write control line 73 and read control line 75. If current is applied in write control line 73 cryotron gate 74 will be resistive and current $w$–$w'$ flows in line 59 and information may be then entered into cells 10, 11 and 12 as hereinbefore described. If current flows in read control line 75 rendering resistive cryotron gate 76, then a current introduced in a read line, for example read line 43, will be forced into branch 41. If the cryotron gate 46 is rendered resistive according to information stored in the cell 10 the resistance is detected in the read line by means (not shown) indicating the presence of a persistent current and therefore a bit of information stored. Lack of resistance indicates the opposite binary bit. Subsequent rows in the second array of the memory, for example the row comprising cells 13–15 and the row comprising cells 16–18, are selected on a similar basis in accordance with the unique address thereof stored in the adjoining rows comprising cells 4–6 and cells 7–9 of the first array of the memory.

In the memory system in accordance with the present invention, the advantages of redundancy found in a data addressed or associative memory are attained without the number of circuit elements usually required in such a memory. Thus, only two cryotrons per storage cell are employed in the address array of the illustrated embodiment as compared with approximately five in the usual associative memory. This advantage is attained because no reading capability is required of this first array of the present memory. Likewise, the storage cell for the second array of the memory system requires only three cryotrons in the illustrated embodiment since no associative capability is desired in the data storage or second array of the system. Therefore a large memory system is attained capable of fault elimination, "electronically," economically making possible the construction of large location addressed memory arrays.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A method of operating a memory system, said memory system including a first array of persistent current superconducting devices for selectively storing unique addresses in word locations thereof and a second array of persistent current superconducting devices having word locations corresponding to and uniquely addressed by information entered into word locations of said first array, said method comprising entering test addresses and information into word locations of said first and second arrays to determine operativeness of such word locations, and entering digits into word locations of said first array indicative of no memory address in the case of inoperative word locations in said arrays, whereby inoperative word locations are not addressed during the operation of said memory system.

2. A memory system comprising a data addressed memory array including a plurality of persistent current superconducting memory loops interconnected in rows and columns, means for simultaneously interrogating all rows of said array with an address interrogation, switching means responsive to a successful comparison between such interrogation and an address stored in one of said rows, a second memory array also including persistent current superconducting memory loops disposed in rows and columns having a row corresponding to each row of said first memory array, said switching means coupling each row of said first array to each row of said second array respectively, and output means for said second array responsive to said switching means to couple the contents of a particular row to said output means.

3. A memory system comprising a data addressed memory array including persistent current superconducting devices interconnected in word groupings, means for simultaneously interrogating all word groupings of said first array with an address, switching means responsive to successful comparison between such address and one such word grouping, a second memory array also including persistent current superconducting memory devices interconnected in word groupings corresponding to word groupings of said first memory array, said switching means coupling said first memory array to said second memory array, and output means for said second array responsive to said switching means to couple the contents of a particular word grouping of said second array to said output means.

4. A memory system comprising a first memory array including first persistent current superconducting memory loops disposed in rows and columns, each said first loop including only writing cryotron means and comparison cryotron means, means for simultaneously comparing all the rows of said first array with a given address and actuating the comparison means in a given row of said array storing that address, a second array also including persistent superconducting storage loops arranged in columns and arranged in rows corresponding to the rows of said first array, the persistent current loops of said second array including only writing cryotron means and readout cryotron means, and switching means coupling each row of said first array to each row of said second array respectively, wherein the comparison cryotron means for a given addressed row of said first array are effective to enable the writing and readout crytron means in the corresponding row of said second array.

5. A memory system comprising a first array of persistent current superconducting memory cells arranged in columns and rows wherein each cell comprises a persistent current loop serially including a write-in cryotron gate and a comparison cryotron grid, means coupling the persistent current memory cells of said first array in columns for comparison of the persistent current contents thereof with address interrogation currents in said coupling means, a plurality of comparison cryotron gate means in cryotron gate relation with said comparison cryotron grid means which gate means are intercoupled in rows in said first array, a plurality of switching means coupled to the comparison gate means in each row of said first array respectively, said switching means being responsive to the respective comparison gate means coupled thereto when persistent current cells of said each row contain a given address corresponding to said interrogation currents, a second array for storing data including persistent current superconducting memory cells arranged in columns and rows corresponding to the rows of said first array, each of said cells in said second array comprising a persistent current loop serially including write-in cryotron gate means and readout cryotron grid means, and coupling means operated by the switching means of rows of said first array to provide selection of the write-in means and readout means in the corresponding rows of said second array.

References Cited

UNITED STATES PATENTS

| | | | |
|---|---|---|---|
| 3,202,964 | 8/1965 | Heath | 340—173.1 |
| 3,318,993 | 5/1967 | Beelitz | 340—173 XR |
| 3,321,746 | 5/1967 | Bremer | 340—173.1 |
| 3,296,599 | 1/1967 | Davies | 340—173.1 |

BERNARD KONICK, *Primary Examiner.*

J. F. BREIMAYER, *Assistant Examiner.*